US008282690B2

(12) United States Patent
Mukhopadhyay et al.

(10) Patent No.: US 8,282,690 B2
(45) Date of Patent: Oct. 9, 2012

(54) PROCESS FOR THE PREPARATION OF SOLAR SALT HAVING HIGH PURITY AND WHITENESS

(75) Inventors: Indrajit Mukhopadhyay, Gujarat (IN); Pushpito Kumar Ghosh, Gujarat (IN); Puthoor Mohandas Vadakke, Gujarat (IN); Abdulhamid Usmanbhai Hamidani, Gujarat (IN); Venkata Rama Krishna Sarma Susarla, Gujarat (IN); Rahul Jasvantrai Sanghavi, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 716 days.

(21) Appl. No.: 11/992,533

(22) PCT Filed: Dec. 9, 2005

(86) PCT No.: PCT/IN2005/000404
§ 371 (c)(1),
(2), (4) Date: Jul. 20, 2009

(87) PCT Pub. No.: WO2007/036949
PCT Pub. Date: Apr. 5, 2007

(65) Prior Publication Data
US 2010/0143220 A1 Jun. 10, 2010

(30) Foreign Application Priority Data
Sep. 30, 2005 (IN) .......................... 2630/DEL/2005

(51) Int. Cl.
*C01D 1/30* (2006.01)
(52) U.S. Cl. ....................................... 23/303; 23/295 R

(58) Field of Classification Search ................ 23/295 R, 23/303
See application file for complete search history.

(56) References Cited

U.S. PATENT DOCUMENTS

| 4,083,781 A | 4/1978 | Conger |
| 4,652,378 A | 3/1987 | Marikovsky et al. |
| 4,765,914 A | 8/1988 | Marikovsky et al. |
| 5,039,427 A | 8/1991 | Conover |
| 2003/0080066 A1 | 5/2003 | Vohra et al. |
| 2005/0098499 A1 | 5/2005 | Hussain |
| 2005/0121395 A1 | 6/2005 | Landis et al. |

FOREIGN PATENT DOCUMENTS

| EP | 0 291 446 | 11/1988 |
| FR | 1 402 862 | 6/1965 |
| JP | 57-187084 | 11/1982 |
| WO | 2004/041731 | 5/2004 |

OTHER PUBLICATIONS

English Abstract of JP 57-187084 dated Nov. 17, 1982.

*Primary Examiner* — Edward Johnson
(74) *Attorney, Agent, or Firm* — Ladas & Parry LLP

(57) ABSTRACT

The process of the invention deals with significant improvements in salt purity and whiteness brought about through treatment of brine with alum prior to charging into crystallizers for solar salt production. The improvements realized are partly on account of elimination of suspended impurities like gypsum and clayey matter in the brine, which may otherwise be carried along with the brine in the crystallizer and finally end up in the salt, and partly due to the improved crystal size and morphology that minimizes embedded impurities in the salt. Rain washing of the heaped salt has resulted in a salt with greatly reduced calcium and sulphate impurity levels hitherto not achieved in solar salt production. Alum treatment by the process of the invention requires no additional time or infrastructure and the cost of the treatment works out to <3 U.S. cents per ton of salt. The process can be implemented in any solar salt works.

32 Claims, No Drawings

PROCESS FOR THE PREPARATION OF SOLAR SALT HAVING HIGH PURITY AND WHITENESS

FIELD OF THE INVENTION

The present invention relates to a cost-effective process for the preparation of solar salt of improved quality directly in the field. More specifically, the process relates to treatment of concentrated brine with alarm to flocculate suspended impurities and use of the resultant clarified brine for the production of solar salt having greatly reduced calcium and sulphate impurities and improved whiteness.

BACKGROUND OF THE INVENTION

The world salt production has crossed two hundred million tons per annum. About 60% of the salt produced is used for industrial applications, chlor-alkali and soda ash industries being the major consumers. Superior quality industrial grade salt is preferred by these industries as the use of such salt reduces the brine purification cost and effluent generation. 40% salt goes for human consumption where improved whiteness has greater customer appeal and can also enhance the stability of iodizing agent in iodized salt.

Solar salt is produced using sea brine, sub-soil brine and lake brine. Salt produced from such brines is invariably contaminated with impurities such as $Ca^{2+}$, $Mg^{2+}$, $SO_4^{2-}$ and heavy metals. Moreover, the salt tends to be less white than desirable. It is therefore of great importance to devise means of making purer solar salt in cost-effective manner.

Reference may be made to the paper entitled "*Primary Brine Treatment Operations*" by D. Elliott at the 1999 Eltech Chlorine/Chlorate Seminar on Technology Bridge to the New Millenium, Ohio, 13 Sep. 1999, wherein the critical importance of salt purity and the deleterious effect of various contaminants including heavy metals on chlor-alkali manufacture is highlighted.

Reference may be made to the research article: "*Rain Washing of Common Salt Heaps*" by M. P. Bhatt et al. (*Salt Research and Industry* 10 (2), 1974, p 13) wherein it is reported that sea salt, as produced in solar pans contains 0.16-18% Ca, 0.3-0.4% Mg and 0.70% $SO_4$, whereas after rain washing the salt contains 0.21% Ca, 0.06% Mg and 0.60% $SO_4$. Although rain washing reduces Mg impurities, the Ca and $SO_4$ impurities cannot be reduced from the harvested salt even by repeated washings. On the contrary, it is observed that the concentration of Ca increases after rain-washing.

In the article "*Washing of Strip Mined Rock and Solar Salt at Leslie Salt Corporation US*" (*Symposium on Salt-I, Vol. 1, the Northern Ohio Geological society Incorporation, Cleveland* (1961), p 449-464), A Woodhill has reported that Ca, Mg and $SO_4$ impurities in solar salt can be reduced by mechanical washing. The main disadvantage of the method is that there is a 15-20% loss of salt and the method requires high capital investment. Moreover, the maximum level of reduction of Ca is 70% and embedded impurities are difficult to remove.

In the article "*Manufacture of Solar Salt by Series Feeding System*" by R. B. Bhatt et al. (*Salt Research and Industry*, 11, 1979, p 9) it has been reported that solar salt With less impurities of Ca can be produced from sea water by a series feeding method Wherein the salt is harvested in two stages i.e. between 25.5-27° Be' and 27-29° Be'. Salt harvested in the first stage is of a superior quality. Although this is a good process the drawback is that calcium and sulphate impurities cannot be reduced beyond a point even though higher levels of reduction are desirable.

A. U. Hamidani and J. R. Sanghavi in their paper entitled "*Improvement in quality of salt from in-land brine of Kharaghoda area India*" (Research and Industry, Vol. 37, March 1992, pp 46-48), have explained a method of reducing the Ca content in salt by establishing a common ion effect in the saturated brine by increasing the sulfate content through addition of either $MgSO_4$ or $Na_2SO_4$. The drawbacks of the method are that though the Ca content of salt is reduced, the Mg and $SO_4$ content cannot be reduced. Moreover, it involves compositional changes which are many times difficult from a logistics and cost point of view.

H. M. Patel, in his research article that appeared in the *Proceedings of 6th International Symposium on Salt*, Vol. 2 pp. 515-533, has disclosed that Ca and $SO_4$ impurities in salt can be reduced using the difference in dissolution rate of NaCl and $CaSO_4$. The main drawbacks of the process are that it employs unit operations like dissolver and chemical process reactor. It also requires addition of lime and soda for the removal of Mg and Ca and subsequent filtration of brine.

In the Indian Patent No. 191912 (notified in the Indian Gazette) entitled "*Preparation of Sodium Chloride Containing Low Ca Impurity from Sea Brine in Solar Salt Work*" by J. R. Sanghavi et al. it is claimed that addition of a polysaccharide additive namely starch in concentration of 50-150 ppm into concentrated brine can reduce calcium impurity in salt to less than 0.05-0.1 percent as $Ca^{2+}$. The drawbacks of the process are that it requires addition of hot solution of starch which is both cumbersome and costly, addition has to be repeated several times and no mention is made of the effect of the treatment on other impurities in salt. No explanation is also provided for the origin of the observed effect.

In the U.S. patent (Igo. U.S. Pat. No. 6,812,011 dated 2 Nov. 2004) entitled "*An Improved Process for the Removal of Ca ions from the Brine by Marine Cyanobacteria*" by S. Mishra et al. it has been claimed that common salt with reduced Ca impurity can be produced from sea/subsoil brine by mopping up Ca in the brine through certain types of marine cyanobacteria. The drawback of this process is that although the process has been demonstrated in small solar pans, it is not readily amenable to scale up.

In the U.S. patent (U.S. Pat. No. 6,776,972 dated 17 Aug. 2004) entitled "*A Process for Recovery of Common Salt and Marine Chemicals from Brine in Integrated Manner*" by R. N. Vohra et al. it is claimed that common salt and marine chemicals of high purity can be recovered in an integrated manner by forced desulphatation of brine with inexpensive sources of $CaCl_2$ such as distiller waste of Solvay Process prior to crystallization of salt. The process works well for any kind of brine and can also be carried out at large scale but the main drawback is the lack of availability of such calcium chloride source in the vicinity of most salt works. Another drawback of the process is that care must be taken to ensure that fresh brine does not mix inadvertently with desulphated brine in the crystallizer since the excess calcium chloride can form gypsum in the crystallizer that would deteriorate the quality of salt.

Mention may be made to the same patent above wherein it is stated that sub-soil brine such as that available in the Gujarat State of India invariably gives salt that is considerably inferior to that obtained from sea brine, having as much as 0.30-0.40% Ca.

In the patent application GB 20020028351 20021205 dated 9 Jun. 2004 entitled "*Extracting Sodium Chloride From Sea Water Using Nano Filtration*" by Kenny Conor et al. it is reported that sea water is pretreated to make it suitable for nanofiltration and the nanofiltered sea water is sent to a thermal desalination plant which operates as a sodium chloride concentrator and a distilled water producer. Sodium chloride is crystallized from the concentrated solution and the process provides a high purity sodium chloride suitable for many industries. It is claimed that the salt so produced eliminates many of the requirements of the primary and secondary brine treatment for the chlor-alkali industries. The nanofiltration process has a higher rejection rate for calcium, magnesium and sulfate ions as compared to Na or Cl ions. The drawbacks of this process are that it would entail high capital investment and additional unit operations which would be uneconomical for standalone production of common salt in solar salt works. Moreover, it needs to be noted that whereas NaCl solubility in water is ca. 35%, its solubility in brine is only 25% which means that advantage can be taken of the common ion effect to reduce Ned solubility in brine which advantage would be lost if the divalent ions were to be completely removed by the process of nanofiltration and more time would be required for evaporation.

In the patent application GB 19540033194 19541116 dated 19 Dec. 1936 entitled "*Improved Method of Preparing Sodium Chloride Brines of High Purity*" Albright and Wilson have claimed that sodium chloride brines low in calcium sulfate content are prepared by dissolving solid sodium chloride contaminated with calcium sulfate in water in presence of a polyphosphate soluble in brine in the concentration range of 50-100 ppm. It is claimed that the amount of calcium sulfate is further decreased by dissolving solid sodium chloride in the presence of both the poly phosphate and water-soluble alkaline earth metal compound such as calcium chloride or acetate or barium chlorides up to 1% level. The drawbacks of this process are that it is less appropriate for solar salt production and more appropriate as a means of post-treatment of brine obtained by dissolving salt.

In their patent application (U.S. Pat. No. 3,891,297 dated 24 Jun. 1975) entitled "*Crystallization of sodium chloride of reduced calcium sulfate content in presence of about 5 to about 500 ppm*" by H. W. Fiedelmart a process for the preparation of the cubic crystalline form of sodium chloride is described either by (1) a feed and bleed procedure comprising admixing an alkali metal phosphate with an aqueous solution of salt to increase the super saturation of calcium sulfate there in and evaporating the brine at an elevated temperature and reduced pressure to cause crystalization of pure salt and concomitantly bleeding brine from the chamber to the feed brine such as to maintain the calcium sulfate in the dissolved state and prevent its precipitation with salt or by (2) subjecting the brine to solar evaporation to concentrate the same to the salt point, i.e. that point at which the salt will crystallize from the brine, adding an alkali metal polyphosphate to brine at this point to increase the super saturation of calcium sulfate there is and processing the brine for salt production following the conventional method. The process involves addition of costly chemicals at a very high dosage level.

In their patent application (WO 2004069371 dated 19 Aug. 2004), Kamishima Hiroshi et al. have claimed that sodium chloride crystals with reduced impurities can be produced from aqueous sodium chloride solutions by passing the solution through a column packed with an adsorbent on to which the impurity is selectively adsorbed. The method also provides a sodium chloride composition for preparing artificial seawater for use in algae cultivation, which is reduced in Mg ion or Ca ion concentration. The drawbacks of the process are that it is not applicable to a multi-component system like sea/sub-soil brine. This process does not give any clue about the production of superior quality salt directly from sea/sub-soil brine in a solar salt works.

In the patent (U.S. Pat. No. 4,072,472 dated 7 Feb. 1978) on *High purity salt from high sulphate salt deposits* by A. Lukes Jerome it is reported that subterranean salt deposit is solution mined, and the resulting calcium and sulfate contaminated brine is treated with soda ash to precipitate calcium compounds. After settling the slurry the clear brine is evaporated in a series of solar ponds to produce high-grade sodium chloride. This process is not economically feasible for large solar salt works where salt is produced from sea/sub-soil brines. Moreover, the process removes only calcium content from salt.

It is well known that the suspended matter in surface water, effluents, wastewater, liquid waste and water from various other sources is removed by sedimentation technique. It is to further known that coagulating agents such as iron salts or aluminium salts have long been employed to improve the conditions for sedimentation. Alum $(Al_2(SO_4)_3.18H_2O)$ being a very cheap source of aluthinium sulfate, is widely used as a coagulating agent for the above purpose (K. Dentel and J. M. Gosset, *J. Am. Water Works Assoc*. April 1988, p 187-188). Sulfate ion in alum appears to act as a catalyst in the formation of polynuclear complexes and their linkage to form a solid lattice (A. C. Venneulen et al. *J. Colloid Interface Sci*. 57, p 115 (1976)). M/s Tramfloc, Inc., Tempe, Ariz., USA has come out with commercial polyacrylamide based synthetic flocculants for clarifying wastewaters and brines.

In the U.S. Pat. No. 3,647,396 dated 7 Mar. 1972 entitled "*Production of High Purity Salt*", H. W. Dewittie et al. have claimed to have developed a process for the recrystallization of sodium chloride in the form of high purity cubic crystals from a sodium chloride source containing calcium sulfate impurity by multieffect evaporation preceded by treatment of the hot sodium chloride saturated brine by flocculants and settling, to cause the undissolved calcium sulfate particles and other suspended solids to agglomerate and settle out of the brine prior to recrystallization of sodium chloride eliminating the conventional requirement for filtering the hot brine. The main drawbacks of the process are that it involves recrystallization which is expensive, time consuming and energy intensive. There is no mention of the utility of the method for production of pure salt directly from sea brine in solar salt works.

AJK Environmental Specialties, Inc., Marchant Ville, N.J., USA has also come out with a commercial flocculating agent by the name of Aquasorb which is a cross linked polymer comprising solely of sodium polyacrylates. It is claimed that the product works well for brine clarification and removal of Ca and Mg. Qumi International, Inc., Texas, USA has also claimed to have produced such polyacrylamide-based flocculants and coagulants for similar purposes. These flocculating agents are used to reduce residual Ca and Mg impurities in brine, such brine being thereafter used directly in industrial applications such as in chlor-alkali and soda ash industries.

It will be evident from the prior art that the purity of salt obtained in solar salt production is indicated to be largely influenced by the composition of the brine although proper methods of brine management such as care to charge and discharge crystallizers at appropriate density, fractional crystallization through series feeding, and deep charging can improve the quality of the salt. The prior art has also provided the limits of solar salt purity achievable in the field through the above Means. It will be further evident that salt quality has been reported to be improved by forcibly altering the composition of brine such as by passing through nanofiltration membrane to reduce divalent ions, adding polyphosphates to maintain gypsum in a supersaturated state, treating with marine cyanobacteria, treatment with starch, and addition of soluble inorganic salts such as calcium chloride, magnesium sulphate or sodium sulphate to forcibly precipitate calcium sulphate prior to salt production. Further, several methods have been described for post purification of salt/brine including: mechanical washing, recrystallisation, treatment with flocculants, selective removal of divalent ions by nanofiltration, and chemical methods of purification, which are typically adopted by downstream industries and not during solar salt manufacture. Whereas use of alum and other flocculation aids for purification of field harvested salt is reported as indicated above, no mention is made in the prior art of any attempt to use alum in solar salt production directly, whereby salt crystallizes during solar evaporation in purer form as a result of events brought about by the clarification of brine prior to charging into the crystallizer, and whereby the salt produced from such alum-treated brine is further refined by the cost-effective methods of water/rain washing of the salt heaps in solar salt works itself to have common salt of a purity hitherto not reported for any solar salt, particularly purity with respect to calcium and sulphate impurity levels. Nor is there any mention in the prior art of changes in crystal morphology brought about by improved clarity of brine during solar salt production and its effect on salt purity.

OBJECTS OF THE INVENTION

The main object of the present invention is to demonstrate the preparation of solar salt of improved quality through treatment of brine in solar saltpans with alum.

Another object of the present invention is to flocculate suspended impurities such as gypsum and clay in the brine and to improve the clarity of the resultant brine as measured using an NTU meter.

Yet another object of the present invention is to minimize such previously precipitated gypsum and clay impurities from physically contaminating the salt.

Yet another of the present invention is to show that there is no significant change in the pH and composition of the brine after alum treatment.

Yet another of the present invention is to show that solar salt obtained from clarified brine exhibits reduced tendency to agglomerate and the crystals appear more cubic in shape and larger, due to reduced number of impurity nucleation sites.

Yet another of the present invention is to demonstrate the beneficial effects of such morphology changes of salt crystals on the purity of the salt.

Yet another of the present invention is to show that solar salt obtained from clarified brine has improved whiteness.

Yet another of the present invention is to show that, when combined with other good practices of salt production such as deep charging, series feeding and heap washing of salt with fresh water or rain water, clarification of brine in this manner yields solar salt in the field having greatly reduced Ca and $SO_4$ impurities hitherto not reported.

Yet another of the present invention is to show that there is no significant build up of Al impurity in the salt as a result of the treatment with alum.

Yet another of the present invention is to show that alum treatment improves the quality of solar salt obtained from a variety of brines including sea, sub-soil and lake brines.

Yet another of the present invention is to give alum treatment to nearly saturated brine to (i) keep volume of brine to be processed at the barest level, (ii) minimize the usage of alum and (iii) minimize post-contamination of the clarified brine.

Yet another of the present invention is to give alum treatment by adding alum solution directly in the pre-crystallizer or by placing required quantity of alum in perforated bags at the mouth of the pre-crystallizer, aiming at zero order kinetics of alum dissolution into brine.

Yet another of the present invention is to take advantage of the long residence time of brine in the pans to minimize alum usage while ensuring complete settling of suspended particles under gravity before charging of the brine to the crystallizer.

Another object of the present invention is to clarify the brine during its adequately long (24-48 hours) residence time in the pre-crystallizer—or during transit from condenser to pre-crystallizer—so as to ensure that there is neither any additional operation (apart from adding the alum solution or alum bags) nor any additional time required for the clarification process.

Yet another of the present invention is to show that brine can be repeatedly charged into the pre-crystallizer used for alum treatment and each time clarified brine having similar NTU is obtained provided adequate dead volume is maintained in the precrystallizer.

Still another of the present invention is to produce value added, product, e.g., low sodium salt, potash and magnesium hydroxide, of improved quality and whiteness from the bittern obtained from alum-treated brine.

SUMMARY OF THE INVENTION

Accordingly, the present invention relates to a process for the preparation of solar salt, the said process comprising the stops of:
 (i) subjecting brine to solar evaporation to crystallize out carbonate salts and gypsum to obtain concentrated brine,
 (ii) dosing of alum into the above said concentrated brine,
 (iii) settling of the suspended particles under gravity and subsequent clarification of brine in the pre-crystallizer,
 (iv) feeding the above said clarified brine into the crystallizer and taking care to prevent flocs from entering into the crystallizer by maintaining adequate dead volume in the pre-crystallizer and also taking care to minimize re-contamination of the clarified brine with clay/soil, and continuing solar evaporation to crystallize out salt,
 (v) repeating the steps of (ii) to (iv) to build up the salt layer in the crystallizer,
 (vi) draining out the bittern from the crystallizer followed by charging fresh brine into the crystallizer and raking the salt,
 (vii) harvesting and heap washing of salt by known method to obtain the desired salt of improved quality and whiteness for utilizing the bittern to produce value added products of improved quality and whiteness.

In an embodiment of the present invention the purity of solar salt obtained is $\geq 99.5\%$ (on dry basis).

In yet another embodiment the solar salt obtained has following specifications $Ca \leq 0.03\%$, $Mg \leq 0.06\%$ and $SO_4 \leq 0.15\%$ and a composition of $Ca \leq 0.005\%$, $Mg \leq 0.03\%$ and $SO_4 \leq 0.10\%$ after further natural rain washing over a monsoon season.

In yet another embodiment Al from the alum used for brine clarification does not contaminate the solar salt, obtained, to any significant extent and the Al content of Salt obtained is $\leq 0.3$ ppm after the conventional purification process.

In yet another embodiment the whiteness of the solar salt obtained is in the range of 82-88 with respect to MgO taken as the primary reference with the whiteness index of 99.

In yet embodiment optical microscopic evidence shows measurable changes in the morphology of salt crystals, obtained, with ower degree of agglomeration wherein impurities can reside at the interface and larger crystal size as compared to the morphology of salt crystals obtained from concentrated brine without any alum treatment.

In yet another embodiment the brine used in step (i) of claim 1, is natural brine and more particularly sea brine, sub soil brine or lake brine.

In yet another embodiment the concentrated brine used in step (i) of claim 1, is obtained in solar salt works by the conventional method of solar evaporation in shallow pans.

In yet another embodiment the concentrated brine used in step (ii) of claim 1 has a density in the range of 20-24° Be'.

In yet another embodiment the concentrated brine is treated, in step (ii) of claim 1, with inexpensive aluminium containing chemicals such as hydrated aluminium sulphate, ferric alum, non-ferric alum, potash alum and poly aluminium chloride and more particularly hydrated aluminium sulphate (alum) for maximum effectiveness in brine clarification.

In yet another embodiment the dosage of alum given to concentrated brine, in step (ii) of claim 1, is in the concentration range of 10-75 ppm and more particularly 30-40 ppm.

In yet another embodiment the alum dosage given to the brine, in step (ii), in the pre-crystallizer with either alum solution or placing perforated bags of alum at the mouth of the precrystallizer.

In yet another embodiment the alum dosage in step (ii) of claim 1, is given to the concentrated brine under ambient conditions.

In yet another embodiment the suspended particles settle along with the floc under gravity in step (iii) of claim 1 within the normal residence time of the concentrated brine in the precrystallizer.

In yet another embodiment complete settling of floc along with suspended impurities and clarification of brine in step (iii) is achieved within a time period of 12-96 hours and more typically 24-48 hours.

In yet another embodiment the turbidity of brine in step (iii) is brought down from 7-11 NTU to the level of 1-4 NTU and typically to the level of 2.5-3.5 NTU due to clarification.

In yet another embodiment the clarified brine in step (iii) does not undergo any measurable change in composition or pH after alum treatment.

In yet another embodiment the clarified brine is fed into the crystallizer, in step (iv) of claim 1, maintaining a height of 2-2.5" of residual brine in the precrystallizer to eliminate the possibility of carry over of flocs to the crystallizer.

In yet another embodiment a dirt free channel, more preferably a lined channel for the flow of clarified brine froth precrystallizer to crystallizer is ensured in step (iv) of claim 1 to minimize the possibility of recontamination of clarified brine with clayey matter.

In yet another embodiment clarified brine is charged into the crystallizer in step (v) of claim 1 either once up to a depth of 13-15" or up to a depth of 11" repeatedly as mentioned in step of claim 1 to build up the salt layer of 3" thickness.

In yet another embodiment solar evaporation of clarified brine in step (iv) of claim 1 was carried out till 27° Be' to produce salt of highest purity.

In yet another embodiment the pre crystallizer is used for the treatment of concentrated brine is with alum repeatedly in step (ii) without affecting the clarity of brine.

In yet another embodiment the bittern is drained out from the crystallizer in Step (vi) of claim 1 on attaining about 27° Be' density.

In yet another embodiment the fresh brine charged into the crystallizer for raking the salt in step (vi) of claim 1 is of about 25° Be' density.

In yet another embodiment clarification of brine eliminates carryover of precrystallized gypsum and clayey matter into the crystallizer in step (iv) of claim 1 thereby minimizing the physical contamination of salt with gypsum and clay resulting in greatly reduced levels of Ca and $SO_4$ in the solar salt obtained.

In yet another embodiment the improved clarity of brine minimizes the possibility of impure particles acting as nucleation sites for salt crystals and thereby reduces the possibility of embedded impurities in the solar salt obtained.

In yet another embodiment the bittern obtained after the harvesting of salt from the clarified brine in step (vii) of claim 1 is utilized to produce bittern based products like low sodium salt, potassium and magnesium chemicals of improved quality and whiteness.

DESCRIPTION OF THE INVENTION

Subsoil, sea or lake brine, as the case may be, of 23.5-24.5° Be' density is dosed with alum solution at an optimized concentration of 30-40 ppm. Alum solution is prepared by dissolving a calculated quantity in dilute sea brine or subsoil brine or lake brine in the density range of 3.5-16° Be'. The dosing of alum solution is facilitated either by spraying it over the brine in a precrystallizer or by its continuous dissolution into flowing brine by placing perforated bags of alum at the mouth of the precrystallizer. The requirement of alum to be dosed is calculated based on the volume of brine in the pre-crystallizer. The volume of brine is measured as per the known procedure usually followed in a solar salt works.

The mechanism of floc formation by giving alum treatment to surface waters has been described in detail by William D. Turner et al (*Colloid factors in water supply, Colloid Chemistry, Vol III, Chemical catalog Inc. NY*, pp 140-41). In the purification of brine by coagulation and settling certain fundamental factors are involved such as nature of coagulant, size of aggregates, apparent density, completeness of reactions etc. These factors are controlled by the quantity of the coagulating agents, pH control, electrolyte concentration etc.

When alum is added to water/brine it goes into solution through the formation of aluminium $Al^{3+}$ and sulfate ion, $SO_4^{2-}$:

$$Al_2(SO_4)_3 \leftrightarrow 2Al^{3+} + 3SO_4^{2-}$$

There are also present in the solution $H^+$ and $OH^-$ ions from the slight ionization of water:

$$H_2O \leftrightarrow H^+ + OH^-$$

Since aluminium hydroxide is a weak base, there will be a tendency for the formation of unionized hydrate:

$$Al^{3+} + 3OH^- \leftrightarrow Al(OH)_3$$

Since the solubility of this hydrate is extremely low, it will tend to come out of the solution in the form of a colloidal precipitate:

$$Al(OH)_3 \leftrightarrow Al(OH)_3$$

Dissolved Solid

The law of mass action thus far governs the reactions, so that as hydroxide ion is removed, the concentration of hydrogen ion builds up to a point where aluminium hydroxide will no longer be precipitated. The alteration of pH, therefore, has an important effect on the precipitation. The dosage of alum is thus adjusted in such a way that the pH of the resultant brine does not cross the optimum level as within a pH range of 5.5-7.0 the precipitate will not be pure hydroxide and here the colloidal nature of the precipitate comes into profound significance. $Al(OH)_3$ acts as a positive sol and is coagulated by negative ions, i.e. sulfate released from the alum. Since the feed brine already contains excess sulfate ions there is no dearth of negative ions and the dosage of alum can be restricted to minimum possible requirement. The suspended particles in the brine are adsorbed on the colloidal gel and form a floc. The floc, being a colloidal gel and having an enormous surface, exhibits greater adsorbing powers; which are responsible for the removal of suspended matter, color, trace elements and organic substances. The pH range over which aluminium sulfate is more effective is 5.3-8.7.

Within the density range of 15-23° Be' gypsum crystallizes out from brine in salt pans and the brine is thereafter taken into the precrystallizer. Alum treatment is given at 23.5-24.5° Be', i.e., after gypsum crystallization. The treatment is given either by spraying solution of alum into the brine or allowing flowing brine to dissolve away solid alum maintaining zero order kinetics for the dissolution process. The concentrated brine on attaining 25° Be' is charged in the crystallizers for salt crystallization. The bittern left after the crystallization of salt is discharged at an appropriate density of 27° Be'. The bittern can be then further evaporated to recover additional salt till a density of 29.0-29.5° Be' although the examples of the present invention pertain only to the salt produced up to 27° Be'. After draining out the bittern, fresh brine of 25° Be' is charged into the crystallizer, the salt is raked and then made into small heaps. These heaps were given a fresh water wash and the data of purity reported for the salts is based on this salt. The salt was thereafter taken to a platform and made into a much bigger heap and allowed to self purify during the monsoon. The purity of some of the rain washed salt is also included in the examples. The bittern can be further processed for the recovery of other marine chemicals, which also benefit from the improved clarity.

The main inventive steps are:
(i) Recognising that, apart from brine composition, the purity of solar salt is affected by other factors such as suspended impurities in the brine.
(ii) Recognising that embedded impurities in salt are difficult to remove and that solar salt should be produced taking care to avoid embedded impurities.
(iii) Recognising that gypsum that separates out at lower densities prior to salt crystallization may not fully separate out and that colloidal gypsum may be present in the brine charged into crystallizer which can physically contaminate the salt and also act deleteriously as nucleation site for salt crystallization.
(iv) Recognising that the whiteness of salt is largely controlled by suspended clayey matter in the brine, which can also affect the nucleation process adversely.
(v) Recognising that finely divided suspended impurities such as gypsum and clay in the brine can be minimized through forced flocculation.
(vi) Another inventive step is the recognition that alum is an inexpensive coagulant which is effective for clarification of raw water and industrial brine, among other applications, as reported in the prior art, and thereafter demonstrating its utility for the purpose of the present invention.
(vii) Another inventive step is obtaining solar salt in the field with extremely low levels of calcium and sulphate through the process of brine clarification not hitherto reported.
(viii) Another inventive step is the recognition that it is best to add alum at a density just below the saturation limit of NaCl for multiple gains, i.e., lower volume to process, lower requirement of alum and lower risk of pest-clarification contamination.
(ix) Another inventive step is the recognition that brine remains for long durations in solar pans and therefore no additional time would be required for alum treatment for the purpose of producing superior quality salt.
(x) Another inventive step is placing perforated bags of alum at the mouth of the precrystallizer to enable the flowing brine to naturally dissolve away the alum under zero order kinetics of dissolution conditions thereby further simplifying the process.
(xi) Another inventive step is optimizing the alum requirement for brine clarification taking into account both the turbidity and concentration of brine and also the residence time of the brine in solar salt pans.
(xii) Another inventive step is the recognition that the resultant bittern would yield bittern-based products of improved quality and whiteness at no extra cost.

The following examples are given by way of illustration and therefore should not be construed to limit the scope of the present invention.

EXAMPLE 1

In this example concentrated sea brine of density 24° Be' and having the chemical composition: $Ca^{2+}=0.54$ g/L (g=gram), $Mg^{2+}=12.50$ g/L, $SO_4^{2-}=17.4$ g/L and $Na^+=96.1$ g/L (243 g/L as NaCl); was taken in several 2 L capacity glass beakers, the volume in each beaker being 1 L. A 10% solution of alum was prepared in dilute sea brine of 3.5° Be' and dosed into each of the beaker so as to vary the alum concentration in the range of 10-75 ppm. The post-treated brine was left undisturbed for 12-16 hours to facilitate the settling of the flocs produced due to the dosing of alum. It was found that alum concentration of 40 ppm was sufficient to settle the suspended particles under ambient conditions and yield brine having high clarity.

EXAMPLE 2

In this example sub-soil brine from Bhavnagar (Gujarat, India) was concentrated to a density of 24° Be' at which point its chemical composition was: $Ca^{2+}=0.90$ g/L, $Mg^{2+}=13.5$ g/L, $SO_4^{2-}=8$ g/L, $Na^+=92.4$ g/L (235 g/L as NaCl). Its turbidity was 7.54 NTU. The brine was taken up to a depth of 15 inches in a solar pan of 400 ft×125 ft size and dosed with 40 ppm of alum solution. The flocs formed were allowed to settle for 24 hrs. The clarified brine (25-25.2° Be) was charged in a salt crystallizer of 32 ft×29 ft size up to a depth of 13" and appeared to have a greenish tinge which is due to scattering effects and not due to any actual coloration of the brine. The brine was subjected to solar evaporation in the open field and a to sample of the brine after 24 hours was found to have a turbidity of 3.0 NTU. After evaporation to a depth of 7", additional brine was charged up to 11" depth and again the brine was evaporated to a depth of 7" and additional brine was charged to top up to 11" depth. The total feed brine volume was ca. 42 m³. Once the brine attained the density of 26.8-27.0° Be' after the final charge, the bittern was discharged and fresh clarified brine of 25° Be' was charged in the crystallizer and the salt was raked. The raked salt was harvested and made into two small heaps. The two heaps were washed with 20% (w/v) fresh water to yield ca. 5 MT of heap washed salt having the specification as >99.5% NaCl (on dry basis). The impurities were as follows: Ca=0.025%, Mg=0.06% and SO$_4$=0.07%. The whiteness index of the salt was found to be 87 (with respect to MgO as primary standard with a whiteness index of 99).

EXAMPLE 3

In this example sub-soil brine of density 24° Be' having similar analysis to that of example 2 was concentrated to 25° Be' in a precrystallizer of 400 ft×125 ft size without giving alum treatment. The brine had a turbidity of 8.5 NTU. It was charged into the crystallizer of 49 ft×42 ft size upto a depth of 13" and a sample of the brine collected 24 h after charging had a turbidity of 5.0 NTU. The brine appears to be pale yellowish-brown in hue from a distance. After evaporation to a depth of 7", additional brine was charged up to 13" depth and again the brine was evaporated to a depth of 6" and additional brine was charged to top up to 13" depth. The total feed brine volume*was ca. 134 m$^3$. Once the brine attained the density of ca. 27.0° Be' after the final charge, the bittern was discharged and fresh brine of 25° Be' was charged in the crystallizer and the salt was raked. The raked salt was harvested and made into two small heaps. The two heaps were washed with 20% (w/v) fresh water to yield ca. 13 MT of heap washed salt having the specification as >98.5% NaCl (on dry basis). The impurities were as follows: Ca=0.09%, Mg=0.09% and SO$_4$=0.25%. The whiteness index of the salt was found to be 78 (with respect to MgO as primary standard with a whiteness index of 99).

It can be seen from Examples 2 and 3 that treatment of brine with alum prior to charging into crystallizer for solar salt production yields salt of improved whiteness and purity.

EXAMPLE 4

In this example sub-soil brine of 24° Be' density having 8 NTU was taken in a condenser pan. 56 Kg of alum in a perforated bag was placed at the mouth of a 400 ft×125 ft precrystallizer and brine from the condenser was charged into the precrystallizer up to a depth is of 12" dissolving away the alum in the process so as to attain an average alum concentration of 40 ppm in the brine. The flocs that were formed were allowed to settle in the precrystallizer for a period of 24-48 hours by which time the density of the brine attained 25° Be'. The turbidity of the clarified brine in the precrystallizer was measured as 2.9 NTU. The clarified brine having a density of 25° Be' was charged in the crystallizer leaving a dead volume of clarified brine along with the flocs up to a depth of 2" in the precrystallizer. The precrystallizer was again charged with sub-soil brine of 24° Be' density having 8 NTU up to a depth of 12" including the dead volume of brine left in the precrystallizer. The fresh brine entering the precrystallizer was treated in a similar manner by keeping 47 Kg. of alum in a perforated bag to maintain a 40 ppm average concentration of alum in the brine. The turbidity of clarified brine was measured as 3 NTU. Five successive charges were made in the precrystallizer in a similar fashion and in all the cases the turbidity of the clarified brine measured on an average 2.9-3.2 NTU as observed in the first charging. The flocs formed during the successive charges remained within the dead volume of two inches depth in the precrystallizer and were not carried into the crystallizer.

EXAMPLE 5

In this example the experiment was conducted in the field using sea brine from creeks in Bhavnagar (Gujarat, India) region fed by the Gulf of Cambay. Brine of density 24° Be' having the chemical composition as: Ca$^{2+}$=0.54 g/L (g=gram), Mg$^{2+}$=12.5 g/L, SO$_4^{2-}$=17.4 g/L and Na$^+$=92.4 g/L, (235 g/L as NaCl) was filled in a precrystallizer of size 400 ft×125 ft and was given alum treatment to the level of 40 ppm. The alum treated brine was left undisturbed in the pan for 24 hours enabling the flocs to settle completely under gravity. The supernatant brine of density 25° Be' was then fed to a crystallizer of 400 ft.×125 ft size up to a depth of 13". The crystallizer was charged only once, unlike in Examples 2 and 3 above. The turbidity of the brine before alum treatment was measured as 5.42 NTU in the precrystallizer while the turbidity after alum treatment was measured as 3.1 NTU in the crystallizer. As in the case of Example 2, the brine appeared to have a greenish tinge although When taken in a 1 liter beaker the brine was completely colorless and transparent. Evaporation was continued up to 27° Be' and the crystallized salt in the pan was harvested and heap washed with 20% (w/v) fresh water. The heap washed salt analyzed on an average Ca=0.023%, Mg=0.06% and SO$_4$=0.06% by weight with >99.6% NaCl (on dry basis). A total of 120 MT of salt was produced from the evaporation of 700 m$^3$ of clarified sea brine. The whiteness index of the heap washed salt, produced from the treated sea brine was measured as 82 (with respect to MgO as primary standard with whiteness index of 99). The same salt was placed in the form to of one big heap ca. 1100 tons and exposed to monsoon rain. The rain washed salt had Ca=0.004%, Mg=0.03% and SO$_4$=0.01%.

EXAMPLE 6

In this example sea brine of density 24° Be' having similar analysis to that of example 5 was concentrated to 25° Be' in a precrystallizer of 250 ft×125 ft size without giving any alum treatment. The brine of 25° Be' was fed into the crystallizer of 20 ft×20 ft Size upto a depth of 13" as described in Example 5. The turbidity of the brine in the crystallizer found to be 4.4 NTU. Evaporation was continued up to 27° Be' and a total of 1 MT of salt having the chemical composition: Ca=0.13%, Mg=0.09% and SO$_4$=0.34% with >98.5% NaCl (on dry basis) was produced. The whiteness index of the salt was found to be 77.

EXAMPLE 7

In this example the experiment was conducted in a large commercial salt works in Mithapur, (Gujarat, India) using sea brine for salt production. Bags of commercial grade alum amounting to 280 kg total weight were placed at the mouth of a brine channel and 7500 m$^3$ of concentrated sea brine of 24° Be' density having the chemical composition as: Ca$^{2+}$=0.54 g/L (g=gram), Mg$^{2+}$=11.50 g/L, SO$_4^{2-}$=17.4 g/L and Na$^+$=96.1 g/L (243 g/L as NaCl) was allowed to flow from the condenser through this channel over 24 h. The moving brine dissolved the alum, the average concentration of alum in brine being 30-40 ppm. The pH of the brine before and after treatment was: 7.15 and 7.12, respectively, while the clear vision length of the brine increased from ca. 7.5" to 9.5" after treatment. Salt produced from this brine had the following specifications: Ca=0.03%, Mg=0.04%, SO$_4$=0.15% by weight with >99.6% NaCl (on dry basis). The whiteness index of the salt was measured as 89. The salt obtained without treatment of brine with alum yielded the following results: Ca=0.06%, Mg=0.09%, SO$_4$=0.38; whiteness index=86-87.

EXAMPLE 8

In this example experiment was conducted with sub-soil/ lake brine from Nawa-Sambhar region of Rajasthan state.

Brine of 13° Be' density having 124.3 g/L NaCl and 10.3 g/L, $SO_4^{2-}$ was concentrated to 23.5° Be'. A part of the concentrated brine was fed directly into the crystallizer while another part was treated with 40 ppm of alum in the precrystallizer and flocs so formed were allowed to settle. The clarified brine was then charged into the crystallizer. Salt samples obtained for three sets of brine without treatment had NaCl content of 97.9%, 98.8% and 98.2% while those obtained from the clarified brine had NaCl content of 99.5%, 98.9% and 99.2%, i.e., the average purity of salt was found to increase from 98.3% to to 99.2%. The average sulphate content of the salt, which is the main impurity in the Nawa-Sambhar salt was found to decrease from 0.7% to 0.07% for alum-treated brine.

EXAMPLE 9

Salt samples obtained from sub-soil brine of Bhavnagar were examined under the optical microscope. It was observed that there was a greater tendency to form agglomerates of small crystals in the case of untreated brine whereas salt obtained from alum-treated brine appeared to have larger primary crystal size with lesser tendency of agglomeration. The crystal surface also appeared sthoother in the latter case.

The main advantages of the present invention are:
1) Sea brine, sub-soil brine and lake brine can be upgraded through the process of the invention to yield improved quality of solar salt directly in the field.
2) Salt having greatly reduced calcium and sulphate impurities are obtained which otherwise are difficult to remove from salt because of low solubility product of gypsum.
3) The process is cost effective as it involves use of inexpensive alum at low dosage level to clarify the brine, which alters the crystal growth process and in turn minimizes impurity entrapment in the salt.
4) The salt produced through the above-mentioned process also exhibits improved whiteness.
5) The process is simple and can be adopted even by unskilled salt producers.
6) The flocs formed, due to the dosing of alum, settle on their own under gravity and such process occurs under ambient conditions and within the normal duration of residence Of the concentrated brine in the holding area/precrystallizer prior to charging into crystallizer.
7) Perforated bags of alum can be placed at the mouth of the precrystallizer to further simplify the alum treatment process while taking care of near zero-order dissolution kinetic to maintain uniformity of alum concentration in the brine.
8) The process of the invention can be practiced in any solar salt works regardless of its size and location so long as alum is available.

TABLE 1

| Estimated Additional Cost of Production of 1500 Tons of Superior Quality Salt as per the Data of Example 6 | |
| --- | --- |
| Required brine volume | 7500 m³ |
| Requirement of alum | 280 kg |
| Material cost for the treatment (Rupees) | Rs 1200 |
| Processing cost (if any) (Rupees) | Rs 300 |
| Total estimated cost (in Indian Rupees) | Rs 1500 (=2-3 U.S. cents per ton of salt) |

We claim:
1. A process for obtaining salt from brine, the said process comprising the steps of:
   (i) subjecting brine to solar evaporation to crystallize out carbonate salts and gypsum to obtain concentrated brine,
   (ii) mixing an alum solution with the above said concentrated brine,
   (iii) settling of suspended particles under gravity and subsequent clarification of brine in a pre-crystallizer,
   (iv) feeding the above said clarified brine into a crystallizer and while inhibiting flocs from entering into the crystallizer by maintaining adequate dead volume in the pre-crystallizer and also minimizing re-contamination of the clarified brine with clay/soil, and continuing solar evaporation to crystallize out salt,
   (v) repeating the steps of (ii) to (iv) to build up a salt layer in the crystallizer,
   (vi) draining out bittern from the crystallizer followed by charging fresh brine into the crystallizer,
   (vii) harvesting and washing of salt to obtain salt.
2. A process as claimed in claim 1, wherein the purity of salt obtained is $\geqq 99.5\%$ (on dry basis).
3. A process as claimed in claim 1, wherein the salt obtained has specifications as $Ca \leqq 0.03\%$, $Mg \leqq 0.06\%$ and $SO_4 \leqq 0.15\%$ and a composition of $Ca \leqq 0.005\%$, $Mg \leqq 0.03\%$ and $SO_4 \leqq 0.10\%$ after further natural rain washing.
4. A process as claimed in claim 1, wherein the Al content of salt obtained is $\leqq 0.3$ ppm after the conventional purification process.
5. A process as claimed in claim 1, wherein the whiteness of the solar salt obtained is in the range of 82-88 with respect to MgO taken as the primary reference with the whiteness index of 99.
6. A process as claimed in claim 1, wherein optical microscopic evidence shows measurable changes in the morphology of salt crystals, obtained, with lower degree of agglomeration wherein impurities can reside at the interface and larger crystal size as compared to the morphology of salt crystals obtained from concentrated brine without any alum solution treatment.
7. A process as claimed in claim 1, wherein the brine used in step (i) of claim 1, is natural brine.
8. A process as claimed in claim 1, wherein the concentrated brine used in step (i) of claim 1, is obtained in solar salt works by the conventional method of solar evaporation in shallow pans.
9. A process as claimed in claim 1, wherein the concentrated brine used in step (ii) of claim 1 has a density in the range of 20-24° Be'.
10. A process as claimed in claim 1, wherein the concentrated brine is treated, in step (ii) of claim 1, with an alum solution having alum selected from the group consisting of hydrated aluminum sulphate, ferric alum, non-ferric alum, potash alum and poly aluminum chloride and mixtures of two or more thereof.
11. A process as claimed in claim 1, wherein the dosage of alum solution given to concentrated brine, in step (ii) of claim 1, is in the concentration range of 10-75 ppm.
12. A process as claimed in claim 1, wherein the alum is mixed with the brine, in step (ii), in the pre-crystallizer as alum solution.
13. A process as claimed in claim 1, wherein the alum solution dosage in step (ii) of claim 1, is given to the concentrated brine under ambient conditions.

14. A process as claimed in claim 1, wherein the suspended particles settle along with the floc under gravity in step (iii) of claim 1 within the normal residence time of the concentrated brine in the precrystallizer.

15. A process as claimed in claim 1, wherein complete settling of floc along with suspended impurities and clarification of brine in step (iii) of claim 1 is achieved within a time period of 12-96 hours.

16. A process as claimed in claim 1, wherein the turbidity of brine in step (iii) of claim 1 is reduced from 7-11 NTU to the level of 1-4 NTU.

17. A process as claimed in claim 1, wherein the clarified brine in step (iii) of claim 1 does not undergo any measurable change in composition or pH after alum solution treatment.

18. A process as claimed in claim 1, wherein the clarified brine is fed into the crystallizer, in step (iv) of claim 1, maintaining a height of 2-2.5" of residual brine in the precrystallizer to eliminate the possibility of carry over of flocs to the crystallizer.

19. A process as claimed in claim 1, wherein a dirt free channel, for the flow of clarified brine from precrystallizer to crystallizer is ensured in step (iv) of claim 1 to minimize the possibility of recontamination of clarified brine with clayey matter.

20. A process as claimed in claim 1, wherein clarified brine is charged into the crystallizer in step (v) of claim 1 either once up to a depth of 13-15" or up to a depth of 11" repeatedly as mentioned in step of claim 1 to build up the salt layer of 3" thickness.

21. A process as claimed in claim 1, wherein solar evaporation of clarified brine in step (iv) of claim 1 was carried out till 27° Be" to produce salt of highest purity.

22. A process as claimed claim 1, wherein the precrystallizer is used for the treatment of concentrated brine with alum solution repeatedly in step (ii) of claim 1 without affecting the clarity of brine.

23. A process as claimed in claim 1, wherein the bittern is drained out from the crystallizer in step (vi) of claim 1 on attaining about 27° Be' density.

24. A process as claimed in claim 1, wherein the fresh brine charged into the crystallizer for raking the salt in step (vi) of claim 1 is of about 25° Be' density.

25. A process as claimed in claim 1, wherein clarification of brine eliminates carryover of precrystallized gypsum and clayey matter into the crystallizer in step (iv) of claim 1 thereby minimizing the physical contamination of salt with gypsum and clay resulting in greatly reduced levels of Ca and $SO_4$ in the solar salt obtained.

26. A process as claimed in claim 1, wherein the improved clarity of brine minimizes the possibility of impure particles acting as nucleation sites for salt crystals and thereby reduces the possibility of embedded impurities in the solar salt obtained.

27. A process as claimed in claim 1, wherein the bittern obtained after the harvesting of salt from the clarified brine in step (vii) of claim 1 is utilized to produce bittern based products like low sodium salt, potassium and magnesium chemicals of improved quality and whiteness.

28. A process as claimed in claim 7, wherein said brine is selected from sea brine, sub soil brine or lake brine.

29. A process as claimed in claim 10, wherein the concentrated brine is treated, in step (ii) of claim 1, with aluminum sulphate (alum solution).

30. A process as claimed in claim 15, wherein complete settling of floc along with suspended impurities and clarification of brine in step (iii) of claim 1 is achieved within a time period of 24-48 hours.

31. A process as claimed in claim 16, wherein the turbidity of brine in step (iii) of claim 1 is reduced from 7 to 11 NTU to the level of 2.5 to 3.5 NTU due to clarification.

32. A process as claimed in claim 19, wherein said channel is a lined channel.

* * * * *